3,205,137
BACITRACIN DERIVATIVES
Arnold D. Lewis and Fred C. Ninger, Livingston, and Ian Pattison, Denville, N.J., assignors to Warner-Lambert Pharmaceutical Company, Morris Plains, N.J., a corporation of Delaware
No Drawing. Filed Mar. 19, 1963, Ser. No. 266,187
4 Claims. (Cl. 167—65)

This invention relates to new and novel bacitracin derivatives which are highly stable and which can be given parentally to treat certain bacterial infections.

This invention also relates to a method of systemic treatment of infected hosts by the parental administration of the novel bacitracin derivatives of this invention.

Bacitracin of commerce is a mixture of polypeptide antibiotics produced by a strain of *Bacillus subtilis*.

The value of bacitracin in the treatment of local infections caused by gram positive cocci notably Staphylococcus is well known. Systemic treatment of these bacterial infections with bacitracin by injection frequently causes kidney damage. In view of the undesirable side effects and toxic symptoms observed in many cases systemic administration of bacitracin is usually not recommended.

A primary object of this invention is to provide bacitracin derivatives which are stable and active and which can be given by parental administration with decreased toxicity.

These and other objects and advantages of this invention will become more apparent after the following detailed description.

It has now been found in accordance with this invention that bacitracin can be converted to a sodium methanesulfonate derivative and that the sodium methanesulfonate derivative of bacitracin while having a greatly reduced toxicity at the same time exhibits an unaltered antibacterial spectrum so that the reduction in toxicity yields products having an outstanding therapeutic index. For example, it is now possible to give by intravenous injection a therapeutic dose such as 1 to 2 grams every 3 to 6 hours of the sodium methanesulfonate derivative of bacitracin, which is equivalent to .83 to 1.66 grams of unmodified bacitracin, without giving rise to the undesirable toxic symptoms normally observed when such an amount of unaltered bacitracin is administered parenterally.

The sodium methanesulfonate derivative of bacitracin is prepared by converting the —NH$_2$ or primary amino groups in the bacitracin molecule into groups of the formula —NHCH$_2$SO$_3$Na. The reaction may be represented in the following equation:

$$RNH_2 + HOCH_2SO_3Na \rightarrow RNHCH_2SO_3Na + H_2O$$

The conversion may be carried out, for example, by reacting a 5 to 20% aqueous solution of bacitracin with a slight excess of sodium hydroxy-methanesulfonate at ambient temperature for about 90 to 120 minutes. The reaction product is readily extracted from the mother liquor by lyophilization. The sodium hydroxy-methanesulfonate used in the reaction may be prepared, for example, by reacting sodium bisulfite with a formaldehyde solution. The cation associated with this methanesulfonate derivative, in addition to sodium may also be any therapeutically acceptable inorganic cation such as calcium or potassium or an organic cation such as ethylenediamine or triethanolamine.

In order further to illustrate this invention but without being limited thereto the following examples are given:

Example 1

6 g. of bacitracin U.S.P. (69.4 units per milligram) are dissolved in 110 ml. of water and cooled to about 3° C. In another 10 ml. of water 0.88 g. of sodium bisulfite and 0.69 ml. of 37% formaldehyde are combined to form sodium hydroxy methanesulfonate which is also cooled to 3° C. and added to the bacitracin solution. The initial pH of the mixture is about 7.4 and this slowly drops over a period of 2 hours to a pH of 6.4 after which there is no change. The solution is then lyophilized giving 4.1 g. of sodium bacitracin methanesulfonate. The lyophilized product does not melt, has a characteristic tan color and a primary amine value of 1.5%. A 2% aqueous solution has a pH of 6.35.

Analysis for sulfur:
Calc. _____ 5.83
Found _____ 5.49

Example 2

1 g. of sodium bacitracin methanesulfonate representing 50 U.S.P. units of bacitracin base/mg. is dissolved with stirring in about 3 to 4 ml. of water for injection U.S.P. and sufficient sodium citrate is added to bring the pH to about 5.6. The resulting solution is then diluted to 5 ml. with additional water for injection and sterilized by filtration through a membrane filter having a pore size of about 0.22 micron. The sterile solution is filled into sterile hypodermic vials. Each milliliter of this solution contains 10,000 U.S.P. units of bacitracin base. Alternatively, the solution after filtration can be lyophilized aseptically.

It is understood that the foregoing detailed description is given merely by way of illustration and that many variations may be made therein without departing from the spirit of our invention.

Having described our invention, what we desire to secure by Letters Patent is:

1. A method for the treatment of systemic gram positive coccal infections in an infected host which consists in the parenteral administration of an effective amount of sodium bacitracin methanesulfonate in a nontoxic liquid vehicle.

2. A bacitracin compound of the formula:

$$RNHCH_2SO_3X$$

wherein R is bacitracin and X is a cation of the group consisting of sodium, potassium, calcium, ethylenediamine and triethanolamine.

3. Sodium bacitracin methanesulfonate.

4. A liquid antibiotic composition suitable for parenteral administration which comprises as active ingredient from 4 to 60 parts by weight of sodium bacitracin methanesulfonate in about 40 to 96 parts by volume of a nontoxic buffered liquid vehicle.

References Cited by the Examiner
UNITED STATES PATENTS 3,044,934  7/62  Wilkinson _____ 167—65
3,061,515  10/62  Fardig _____ 167—65

LEWIS GOTTS, *Primary Examiner.*
FRANK CACCIAPAGLIA, JR., *Examiner.*